(12) United States Patent
Woods et al.

(10) Patent No.: US 6,983,391 B2
(45) Date of Patent: Jan. 3, 2006

(54) MODULAR SYSTEM WITH SYNCHRONIZED TIMING

(75) Inventors: Stanley P. Woods, Cupertino, CA (US); Hans J. Sitte, San Jose, CA (US); Bruce Hamilton, Menlo Park, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 605 days.

(21) Appl. No.: 09/853,112

(22) Filed: May 9, 2001

(65) Prior Publication Data
US 2002/0169993 A1    Nov. 14, 2002

(51) Int. Cl.
*G06F 1/12*    (2006.01)
*G06F 1/04*    (2006.01)

(52) U.S. Cl. ............ 713/400; 713/401; 713/500; 710/59; 710/60; 710/61

(58) Field of Classification Search ........... 713/400, 713/502
See application file for complete search history.

(56) References Cited

U.S. PATENT DOCUMENTS

| | | | | |
|---|---|---|---|---|
| 4,443,865 A | * | 4/1984 | Schultz et al. | 712/242 |
| 5,293,374 A | * | 3/1994 | Eidson | 702/117 |
| 5,452,201 A | * | 9/1995 | Pieronek et al. | 700/83 |
| 5,566,180 A | * | 10/1996 | Eidson et al. | 370/473 |
| 5,615,136 A | * | 3/1997 | Baraton et al. | 703/21 |
| 5,648,959 A | * | 7/1997 | Ilyadis et al. | 370/445 |
| 5,661,700 A | * | 8/1997 | Weppler | 368/46 |
| 5,887,029 A | * | 3/1999 | Husted et al. | 375/224 |
| 5,947,907 A | * | 9/1999 | Duich | 600/483 |
| 5,978,753 A | * | 11/1999 | Eidson | 702/188 |
| 5,995,376 A | * | 11/1999 | Schultz et al. | 361/788 |
| 6,073,053 A | * | 6/2000 | Dummermuth | 700/2 |
| 6,236,623 B1 | * | 5/2001 | Read et al. | 368/46 |
| 6,311,149 B1 | * | 10/2001 | Ryan et al. | 703/21 |
| 6,356,967 B1 | * | 3/2002 | Vaisanen et al. | 710/300 |
| 2003/0200076 A1 | * | 10/2003 | Kodosky et al. | 703/22 |

OTHER PUBLICATIONS

"The PXI Modular Instrumentation Architecture", PXI White Paper, Revised Sep. 12, 2000.*
"Modular Instruments at PC Prices", Ron Wolfe, National Instruments, 1998.*
"PXI Specification", Revision 1.0, Aug. 20, 1997. National Instruments.*
"PXI Specification", Revision 2.0, Jul. 28, 2000. PXI Systems Alliance.*
Time synchronization in an NT Network, Tao Zhou, Feb. 1997, article No. 522, www.winmag200.com/articles.*

* cited by examiner

*Primary Examiner*—Kim Huynh
*Assistant Examiner*—Alan S. Chen

(57) ABSTRACT

A system with a set of modules having synchronized timing. The synchronized timing of the modules enables precise coordination of measurements and stimuli for an arbitrary number of modules. The modules communicate and maintain time synchronization using a communication mechanism that may be adapted to localized positioning of modules and/or widely dispersed positioning of modules with no change to the underlying functionality in the modules.

25 Claims, 3 Drawing Sheets

MODULAR SYSTEM WITH SYNCHRONIZED TIMING

BACKGROUND OF THE INVENTION

1. Field of Invention

The present invention pertains to the fields of measurement/control systems. More particularly, this invention relates to a modular system with synchronized timing.

2. Art Background

A wide variety of systems including measurement/control systems commonly include a variety of instruments that provide measurements and apply stimulus. Examples of instruments are numerous and include instruments for measuring physical characteristics such as temperature, pressure, voltage, etc., as well as the instruments for generating stimuli such as heat, mechanical stimuli, chemical stimuli, electrical stimuli, etc.

It is often desirable in a system to provide coordination of the measurements obtained by its instruments and/or the stimuli applied by its instruments. For example, it may be desirable to precisely control the timing of stimuli applied by an instrument and/or accurately record the time at which measurements are obtained by the instrument. In addition, it is often desirable that a system have a modular design in which different types of measurement modules and stimulus modules may be employed.

Prior systems commonly employ modular instruments which usually have an instrument housing that holds a set of modules each of which performs a measurement and/or stimulus function. Typically, the modules in such an instrument housing communicate via an internal bus of the instrument housing. Examples of internal buses include VME, VXI, PXI, PCI, and CPCI. One example of a such a bus implemented with a set of cables is the IEEE 488 standard. Typically, the application of stimuli and/or the measurements obtained by such an instrument are coordinated by transferring commands via its control bus or by using dedicated external trigger wires.

Typically, such an instrument housing accepts up to a maximum number of modules. If a system requires a number of modules that exceeds the maximum for an instrument housing then additional instrument housings must usually be employed. The use of multiple instrument housings usually requires an engineering effort to provide coordination among the modules contained in different instrument housings. Unfortunately, such an engineering effort typically increases the costs associated with using prior systems.

In addition, the modules of prior systems are typically confined to an instrument housing or a relatively short distance from an instrument housing and have transducer connections of limited length. As a consequence, such prior systems are usually not suitable for obtaining coordinated measurements and applying coordinated stimuli at points of a system which are widely dispersed.

SUMMARY OF THE INVENTION

A modular system is disclosed with a set of modules having synchronized timing. The synchronized timing of the modules enables precise coordination of measurements and stimuli for an arbitrary number of modules. The modules communicate and maintain time synchronization using a communication mechanism that may be adapted to localized positioning of modules and/or widely dispersed positioning of the modules. Coordination of measurements and/or stimuli may thus be accomplished for systems which span small or large distances, and which have few modules or more than can fit in an enclosure. This coordination is accomplished with no change to the underlying functionality in the modules or the method of using the modules. This avoids substantial modification to the software in the modules and avoids substantial modifications to higher level application software that uses the modules.

Other features and advantages and applications of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
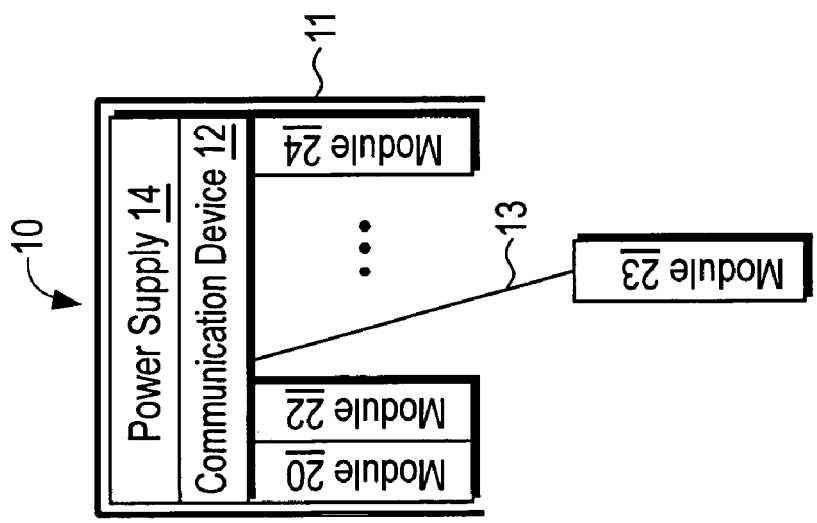
FIG. 1 shows a system according to the present teachings with a relatively localized positioning of modules.

FIG. 1 shows a system 10 according to the present teachings. The system 10 includes a set of modules 20–24 each of which is adapted to obtain a measurement or apply a stimulus in the system 10. Examples of a measurement are numerous and include voltmeter functions, oscilloscope functions, logic analyzer functions, obtaining digital inputs, obtaining digital inputs which are trigger outputs from other devices, reading a counter, a communication protocol analyzer, and network analyzer. Examples of a stimulus are also numerous and include digital outputs, digital outputs used to trigger other devices, signal generator functions, an arbitrary waveform generator, a digital data generator, and a pulse generator. In addition, the instrument function may be a switch matrix used to control the routing of measurement and stimulus signals.

The system 10 includes a communication device 12 that enables communication among the modules 20–24. The communication device 12 is selected to provide localized and/or widely dispersed communication among the modules 20–24.

Each module 20–24 includes mechanisms for communication according to a communication protocol associated with the communication device 12. The communication protocol is preferably a packet-based protocol. In one embodiment, the communication protocol is Ethernet and the communication device 12 may be an Ethernet hub, repeater, or switch.

Each module 20–24 includes a synchronized clock that synchronizes its time with the times in the synchronized clocks of the other modules 20–24. In one embodiment, the synchronized clocks in the modules 20–24 perform time synchronization by measuring the transmit and receive time of timing packets transferred via the communication device 12 and communicating these measured times to each other.

In one embodiment, synchronization is performed in the modules 20–24 using a synchronization protocol described in U.S. Pat. No. 5,566,180. Other possible mechanisms for time synchronization among the modules 20–24 include network time protocol (NTP), global positioning system (GPS) receivers, polling conducted by a master clock, and the periodic broadcast of time to the modules 20–24.

Each module 20–24 includes mechanisms for performing a measurement function or a stimulus function. For example, if the module 20 is a temperature sensor then it may include the appropriate hardware/software for sensing temperature and for generating digitized values that indicate the sensed temperature. In another example, if the module 20 is a signal generator then it may include the appropriate circuitry/software for generating a signal. In some embodiments, some of the measurement hardware or stimulus hardware, and/or digitizing hardware may be implemented in a sub-system to which the module 20 may be connected. For example, one or more of the modules 20–24 may be connected to an appropriate sensor or actuator.

The embodiment of the system 10 shown in FIG. 1 is one in which the modules 20–24 plug into an instrument bay 11 that holds the communication device 12 and a power supply 14. The physical communication links between the modules 20–24, for example Ethernet 10BaseT lines, are contained in the instrument bay 11. This embodiment is adapted to applications in which the points of a system which are to be measured and/or stimulated are in a relative close spatial proximity.

One or more of the modules 20–24 may be removed and operated outside of the instrument bay 11 with no change to the underlying communication and time synchronization or methods of coordinating measurements and/or stimuli among the modules 20–24. For example, the module 23 is located outside of the instrument bay 11. The module 23 is connected to the instrument bay 11 via a set of wires 13 that provide power lines and communication lines. The power line portion of the wires 13 and the communication line portion of the wires 13 may be contained in the same cable or in separate cables.

Figure 2:
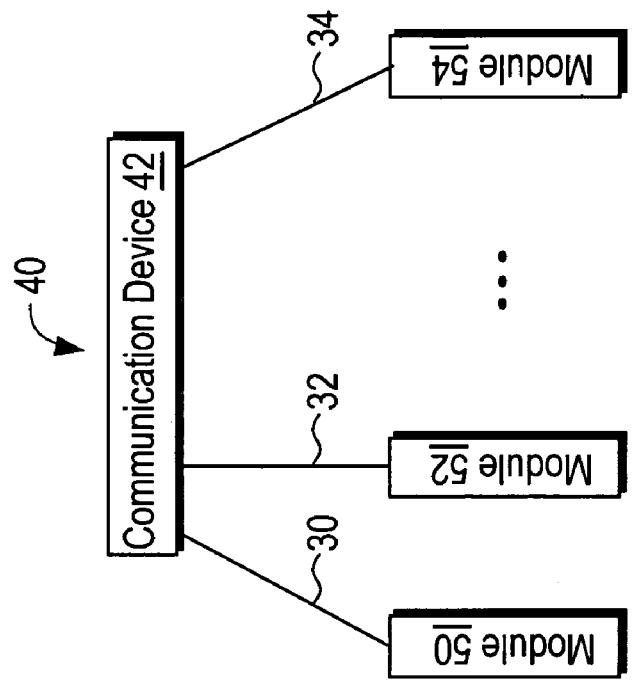
FIG. 2 shows a system according to the present teachings which is suitable for a more dispersed positioning of modules.

FIG. 2 shows a system 40 according to the present teachings for applications in which the points of the system 40 which are to be measured and/or stimulated may be spaced farther apart. The system 40 includes a communication device 42 and a set of modules 50–54 which include synchronized clocks and mechanisms for applying a stimulus and/or performing a measurement and for performing communication via the communication device 42. Though not shown, the system 40 includes an instrument bay housing with a power supply.

The modules 50–54 communicate with the communication device 42 via a set of physical communication links 30–34. The physical communication links 30–34 have a length adapted to the particular spatial arrangement of the modules 50–54 and a physical implementation which is adapted to the communication protocol of the communication device 42.

Figure 3:
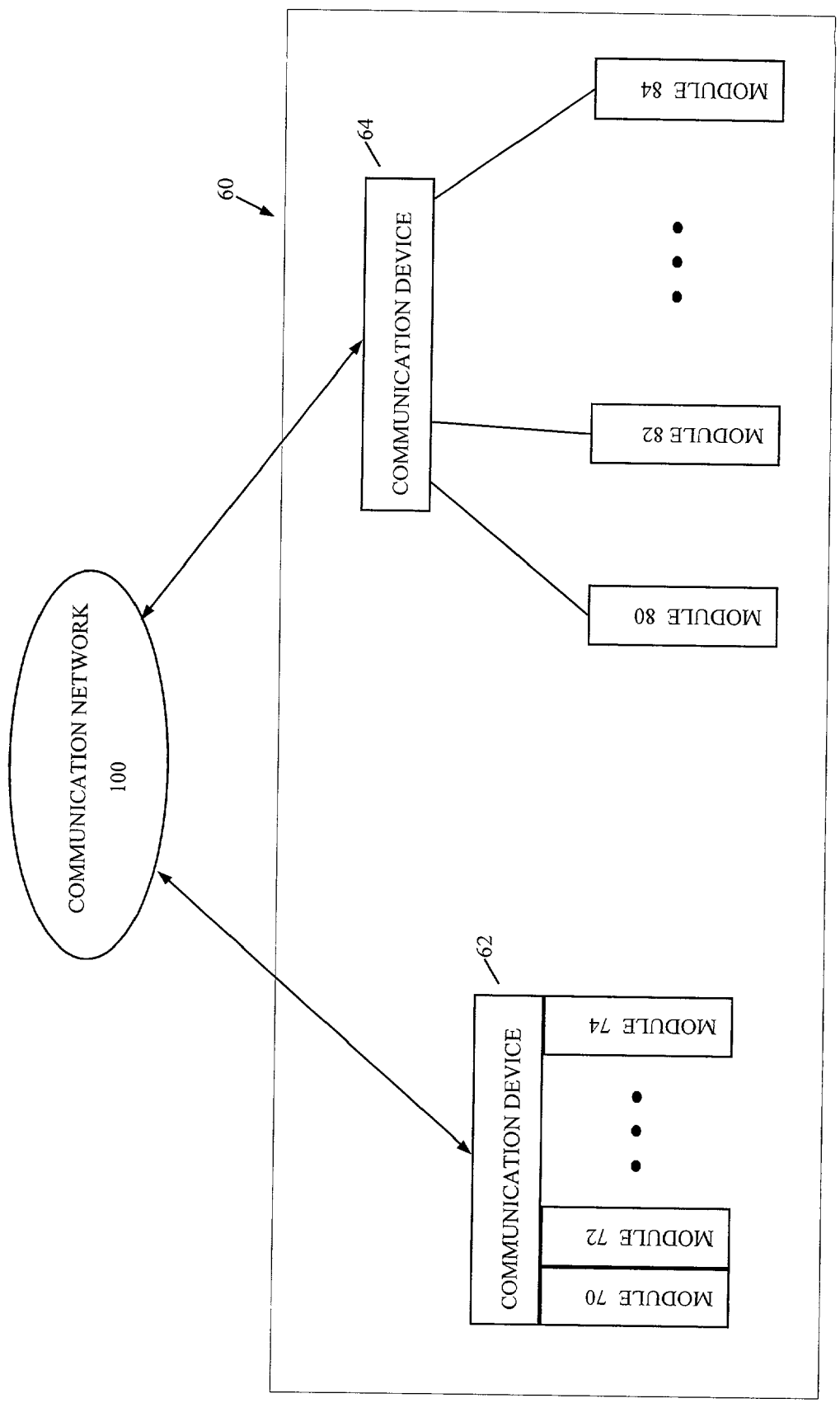
FIG. 3 shows a system according to the present teachings which is suitable for greatly dispersed modules.

FIG. 3 shows a system 60 according to the present teachings for applications in which the points of the system 60 which are to be measured and/or stimulated may be spaced at great distances apart. The system 60 includes a set of modules 70–74 that communicate via a communication device 62 and a set of modules 80–84 that communicate via a communication device 64. The communication devices 62–64 may each be contained in an instrument bay housing that includes a power supply.

The communication devices 62 and 64 communicate via a communication network 100. The communication network 100 represents an infrastructure of physical communication links and hardware/software for widely dispersed communication. The communication network 100 enables transfer of communication packets among the modules 70–74 and 80–84 including the timing packets used for clock synchronization by the modules 70–74 and 80–84 and event packets associated with measurement events and stimulus events. The communication network 100 may be a packetized network such as Ethernet or a network such as LonTalk which is adapted to control systems.

Numerous other arrangements for a system with modules having synchronized clocks according to the present techniques are possible. For example, the communication network 100 may be a sub-net of a larger network which is connected to other modules having synchronized clocks. In one embodiment, the protocol for clock synchronization among the modules does not cross sub-nets. In embodiments that include multiple sub-nets each sub-net may be provided with a mechanism for clock synchronization such as GPS time. The GPS time may then be used in a master clock to drive clock synchronization in the modules on each sub-net. Alternatively, specialized routers that function as both master and slave of the time synchronization protocol used in the modules may be employed to propagate the synchronization protocol across sub-nets.

Figure 4:
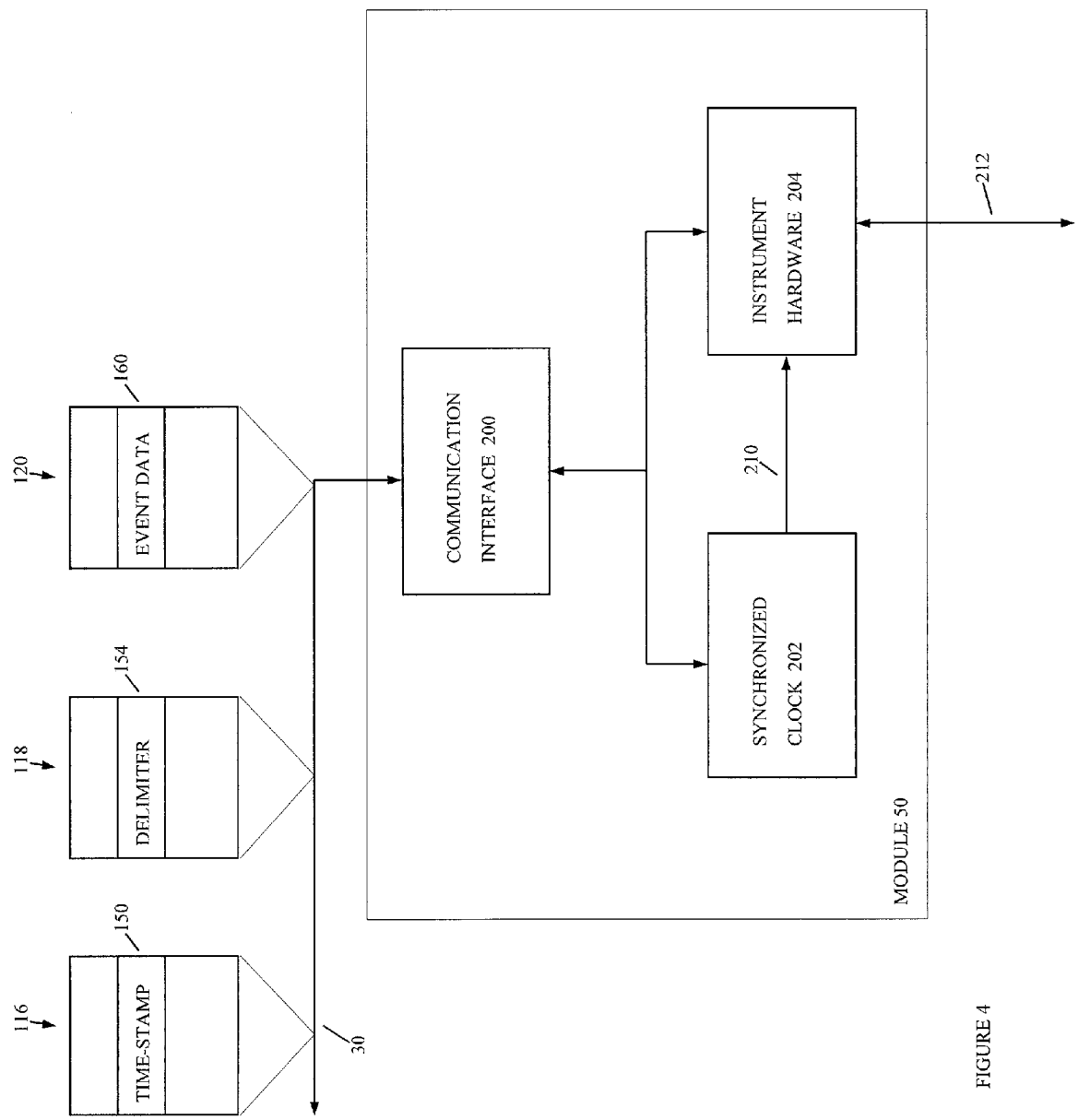
FIG. 4 shows an example embodiment of a module according to the present teachings.

FIG. 4 shows one embodiment of the module 50. The modules 20–24, 52–54, 70–74, and 80–84 may be implemented in a substantially similar manner. The module 50 includes a communication interface 200, a synchronized clock 202 and a set of instrument hardware 204.

The communication interface 200 enables transmission and reception of messages in packets via the physical communication link 30. A timing data packet 118 and a follow up packet 116 carried on the physical communication link 30 are packets used for time synchronization. An event packet 120 carried on the physical communication link 30 is associated with the measurement or stimulus behavior of the instrument hardware 204.

The communication interface 200 provides the received timing data packet 118 and the received follow up packet 116 to the synchronized clock 202. The timing data packet 118 and the follow up packet 116 are generated by a master clock in one of the other modules with which the module 50 communicates. Alternatively, the master clock may be contained in a controller or computer system or communication device which is reachable via the physical communication link 30. The master clock may be a real-time clock.

The timing data packet 118 includes a delimiter 154 that identifies it as a timing data packet for the synchronization protocol. The follow up packet 116 includes a time stamp 150. The time stamp 150 indicates the local time in the master clock when the timing data packet 118 was generated.

The synchronized clock 202 includes a time packet recognizer and a clock and a latch. The time packet recognizer detects a unique timing point in the recovered bit stream for the timing data packet 118. Upon detection of the unique timing point, the time packet recognizer causes the latch to latch a time value from the clock. The time value held in the latch indicates the local time at which the time packet recognizer received the timing data packet 118. Thereafter, the time packet recognizer receives the follow up packet 116 and extracts the time stamp 150. The difference between the time stamp 150 and the time value in the latch indicates the relative synchronization of the master clock and the synchronized clock 202. Once this difference is computed the time packet recognizer uses it to adjust the time value in the clock inside the synchronized clock 202 to conform it to the master clock.

The adjustment of the time value in the clock in the synchronized clock 202 may be accomplished by implementing the clock as a counter driven by an oscillator with sufficient stability and resolution given the timing precision desired. The least significant few bits of the counter may be implemented as an adder so that an increment of the counter on oscillator periods may be occasionally increased or decreased to effectively speed up or slow down the clock in accordance with the results of the computation of the difference between the time stamp 150 and the time held in the latch.

The communication interface 200 provides the received event packet 120 to the instrument hardware 204. The instrument hardware 204 decodes a set of event data 160 in the event packet 120 and carries out a measurement or stimulus function accordingly.

If the module 50 performs a measurement function then the event data 160 may include a command to start obtaining measurements or to stop obtaining measurements or to obtain measurements at specified times or at specified time intervals. In response, the instrument hardware 204 obtains measurements via a probe 212. The instrument hardware 204 obtains a synchronized time 210 from the synchronized clock 202 and may use it to trigger a measurement or to timestamp a measurement once obtained. The instrument hardware 204 may generate messages that contain measurements obtained and associated time-stamps and send the messages via the physical communication link 30. A computer system or controller or other instrument may gather these messages and extract the obtained measurements.

If the module 50 performs a stimulus function then the event data 160 may include a command to apply the stimulus at a specified trigger time. In response, the instrument hardware 204 triggers the application of the stimulus via the probe 212 by comparing the synchronized time 210 from the synchronized clock 202 to the trigger time from the event data 160.

Coordination in a system may be provided by event packets transferred to the modules to set up the measurement or stimulus functions. The event packets may specify times at which event functions are to be triggered. The modules that time-stamp measurements may provide return packets that contain the measured data and time-stamps. The fact that the synchronized clocks in the modules maintain time synchronization with respect to one another yields precise coordination of event triggering and precise time-stamps of measurement events.

The instrument hardware 204 may include a processor and associated software for performing an application-specific measurement or stimulus functions. The processor may also execute software for the communication protocol associated with the communication interface 200. For example, the processor may execute communication protocol layers associated with Ethernet communication.

The view of the software coordinating measurements, stimuli, or measurement results using module 50 is the same whether the module is installed in an instrument bay as in the embodiment shown in FIG. 1 or is dispersed as in one of the embodiments shown in FIGS. 2–3. For example, the same communication protocol is used for all these embodiments with the same packet format. This consistent software view enables flexible placement of the modules with minimal engineering effort for adapting the modules to different physical configurations.

The modules described above provide a stand-alone measurement or stimulus function like miniature instruments while providing the capability of being grouped together into multiple channels in one location or across wide distances. As a consequence, the range of applications for the modules is large. The modules provide for relatively easy coordination using their synchronized clocks.

Each module according to the present teachings contains an entire instrument from input and/or output with communications and time synchronization capability. The modules communicate and/or interact via an external network which may be user accessible and with or without a controller or computer. Whether the modules are contained in the same physical case, in near proximity, or whether they are widely dispersed over a large geographic area (including but not limited to the Earth) is no longer a concern of the instrument user.

A system with modules according to the present teachings may be employed in data acquisition systems, distributed control systems, supervisory control and data acquisition systems, and programable logic controllers, to name a few examples.

According to the present teachings, coordinated application of stimuli and/or coordinated measurements may be achieved by sending a message to each module which includes an identification of which stimulus to apply or measurement to obtain and a time at which the stimulus is to be applied or the measurement obtained. This method of coordinated stimuli/measurement is substantially unchanged in all of the module configurations disclosed above. This avoids substantial re-engineering when instruments are added, removed, or changed in the system as is common. This is in stark contrast to prior systems in which coordinated measurements and/or stimuli is achieved by requesting a predefined measurement and/or stimulus from a controller or by writing a special-purpose program and running on the controller. If prior instruments are connected to separate controllers then the system must be re-engineered so that its operation does not require coordinated application of measurements and/or stimuli.

According to the present teachings, measurements which are made by different modules (possibly in an uncoordinated manner) may be correlated by having each module report its result along with the time at which it took the measurement (the time-stamp). It may then be determined that if two measurements have equal time-stamps they were taken at the same time. If their time-stamps differ it can be determined which was taken first and how much time elapsed between measurements. This benefit is substantially unchanged in all of the module configurations disclosed above and helps avoid re-engineering in response to changes in the system. This is in stark contrast to prior systems in which measurements are correlated according to their sequence of arrivals. In such systems, it cannot be determined precisely when the measurements were made. As such a prior system gets physically larger, the delay between a measurement and the arrival of its result gets larger and increases uncertainty about the precise time of the measurement.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A modular system, comprising:
   instrument bay for holding a set of modules that plug into the instrument bay each module capable of communication via a set of network communication links and each module having a clock and means for synchronizing the clock in response to messages on the network communication links and each module performing a function such that the functions are coordinated by a synchronized time in the clocks thereby enabling one or more of the modules to be located outside of the instrument bay with no change to an underlying functionality in the modules;

at least one communication device contained in the instrument bay that enables communication among the modules via the network communication links wherein the communication device is selected in response to a physical placement of the modules in the system.

2. The modular system of claim 1, wherein the communication device is a communication hub for the network communication links to the modules.

3. The modular system of claim 1, wherein the communication device is a communication repeater for the network communication links to the modules.

4. The modular system of claim 1, wherein the communication device is a communication switch for the network communication links to the modules.

5. The modular system of claim 1, wherein one or more of the modules includes means for applying a stimulus in response to the synchronized time.

6. The modular system of claim 1, wherein one or more of the modules include means for obtaining a measurement and for generating a time-stamp for the measurement using the synchronized time.

7. The modular system of claim 1, wherein one or more of the modules includes means for obtaining a measurement at a given time using the synchronized time.

8. The modular system of claim 1, wherein one or more of the modules includes means for obtaining a message via the network communication links that includes an identification of a measurement and a time at which the measurement is to be obtained.

9. The modular system of claim 1, wherein one or more of the modules includes means for obtaining a message via the network communication links that includes an identification of a stimulus and a time at which the stimulus is to be applied.

10. The modular system of claim 1, wherein one or more of the modules includes means for obtaining a message via the network communication links that includes an identification of a measurement and a time interval during which a series of the measurements are to be obtained.

11. The modular system of claim 1, wherein one or more of the modules includes means for obtaining a message via the network communication links that includes an identification of a stimulus and a time interval during which the stimulus is to be applied.

12. The modular system of claim 1, wherein one or more of the modules includes means for transferring a message via the network communication links that includes a measurement and a time at which the measurement was obtained.

13. A method for coordinating a set of functions in a modular system, comprising:

coupling each of a set of modules of the modular system to a set of network communication links;

selecting at least one communication device for providing communication among the modules in response to a physical placement of the modules and placing the communication device in the instrument bay;

synchronizing a clock in each module using messages carried on the network communication links;

performing the functions in response to a synchronized time in the clocks thereby enabling one or more of the modules to be located outside of the instrument bay with no change to an underlying functionality in the modules.

14. The method of claim 13, wherein performing the functions includes applying a stimulus in response to the synchronized time.

15. The method of claim 13, wherein performing the functions includes obtaining a measurement and generating a time-stamp for the measurement using the synchronized time.

16. The method of claim 13, wherein performing the functions includes obtaining a measurement at a given time using the synchronized time.

17. The method of claim 13, further comprising transferring a message via the communication device that includes an identification of a measurement and a time at which the measurement is to be obtained.

18. The method of claim 13, further comprising transferring a message via the communication device that includes an identification of a stimulus and a time at which the stimulus is to be applied.

19. The method of claim 13, further comprising transferring a message via the communication device that includes an identification of a measurement and a time interval during which a series of the measurements are to be obtained.

20. The method of claim 13, further comprising transferring a message via the communication device that includes an identification of a stimulus and a time interval during which the stimulus is to be applied.

21. The method of claim 13, further comprising transferring a message via the communication device that includes a measurement and a time at which the measurement was obtained.

22. A modular system, comprising:

first instrument bay for holding a first set of modules each capable of communication via a first set of network communication links, the first set of modules each having a clock and means for synchronizing the clock in response to messages on the first set of network communication links, the first set of modules each performing a function such that the functions of the first set of modules are coordinated by a synchronized time in the clocks in the first set of modules, the first instrument bay holding a first communication device that enables communication among the first set of modules via the first set of network communication links and that enables communication via a communication network;

second instrument bay for holding a second set of modules each capable of communication via a second set of network communication links, the second set of modules each having a clock and means for synchronizing the clock in response to messages on the second set of network communication links, the second set of modules each performing a function such that the functions of the second set of modules are coordinated by a synchronized time in the clocks in the second set of modules, the second instrument bay holding a second communication device that enables communication among the second set of modules via the second set of network communication links and that enables communication via the communication network such that the synchronized time in the clocks in the first and second sets of modules enables placement of one or more modules of the first and second sets of modules outside of the first and second instrument bays with no change to an underlying functionality in the modules.

23. The modular system of claim 22, wherein the first and second sets of modules exchange messages for synchronizing the clocks via the communication network.

24. The modular system of claim 22, wherein the first and second sets of modules exchange messages pertaining to the functions via the communication network.

25. The modular system of claim 22, wherein the first and second communication devices are coupled to a sub-net of the communication network.

* * * * *